March 22, 1927.  1,621,733
C. M. McCORD
BEARING AND BUSHING REMOVER
Filed Sept. 19, 1925
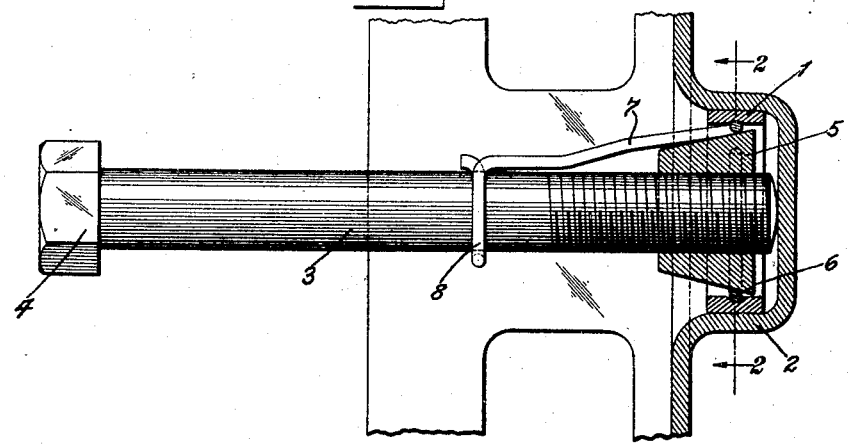
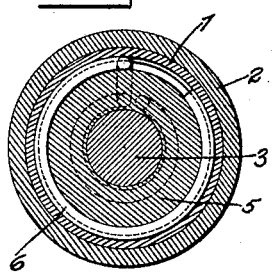
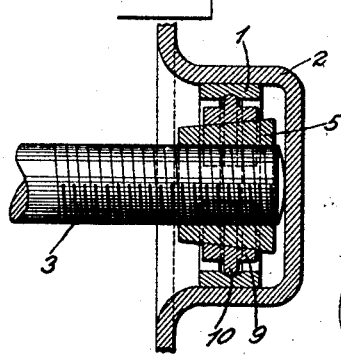
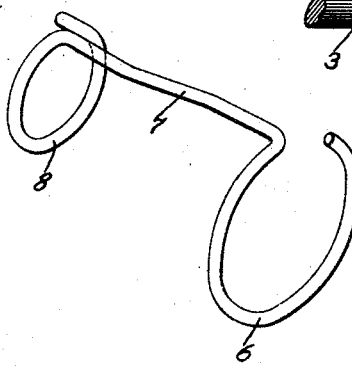
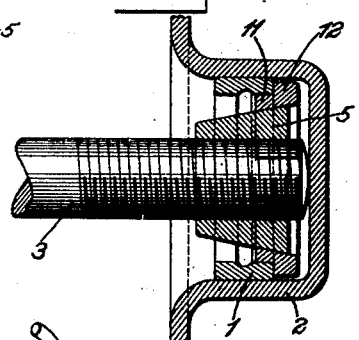
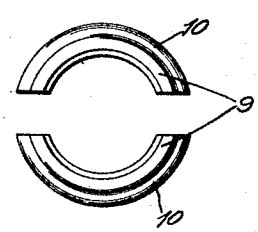
Inventor:
Claude M. McCord,
by Rippey Kingsland,
His Attorneys.

Patented Mar. 22, 1927.

1,621,733

UNITED STATES PATENT OFFICE.

CLAUDE M. McCORD, OF RICHMOND HEIGHTS, MISSOURI.

BEARING AND BUSHING REMOVER.

Application filed September 19, 1925. Serial No. 57,281.

This invention relates to devices for removing bearing races and bushings and the like from the supports in which they are mounted.

An object of the invention is to provide a device for use in removing bearing races, bushings and the like from the supports in which they are mounted, and comprising an element engageable with the bearing race or bushing and a device for effecting engagement of said element with the bearing race or bushing and actuating the same in a direction to force the bearing race or bushing from the support.

Another object of the invention is to provide a device for use in removing bearing races or bushing from the supports in which they are mounted consisting of a key element engageable with the races or bushings, a tapering member for spreading the key element into engagement with the races or bushing, and a device having operative connection with said member for moving the same longitudinally in a direction to cause the key element to force the bearing races or bushings from the support.

Other objects will appear from the following description, reference being made to the accompanying drawing, in which—

Fig. 1 is a view showing the device engaged with a bearing race ready to force the same from the support in which it is mounted.

Fig. 2 is a sectional view on the line 2—2 of Fig. 1.

Fig. 3 is a perspective view of the key element of Fig. 1.

Fig. 4 is a view showing a modified form of key element.

Fig. 5 is an end view of the key element of Fig. 4.

Fig. 6 is a view showing another modified form of the key element.

Fig. 7 is an end view of the key element of Fig. 6.

As shown in Fig. 1 the bearing race 1 is rigidly mounted in a support 2 of such form that it is difficult to remove the bearing race therefrom. The remover shown includes a bolt 3 having a polygonal head 4 on one end and the other end threaded. A conical key spreader and actuator 5 is screwed on the threaded end of the bolt and operates to spread the key into rigid engagement with the bearing race and actuate the key in a direction to force the bearing race from support.

The key shown in Figs. 1, 2 and 3 consists of a wire or rod shaped to provide an open expansible and compressible ring 6 at one end designed and adapted to be inserted in the bearing race and forced into the groove of the race when the bolt is turned and the body 5 is held from turning. One end 7 of the wire or rod is extended laterally and its extremity is shaped to provide a ring 8 around the bolt 3 so as to hold the key device in permanent connection with the bolt. In using this device the body 5 is screwed toward the end of the bolt and the parts are passed through the race 1 by compressing the ring 6. The end of the bolt abuts against the end wall of the support. The bolt is then turned to screw the body 5 onto the bolt and, due to the tapered formation of said body 5, the ring 6 is expanded into the groove of the race 1 and further rotation of the bolt 3 continues to screw the body 5 toward the head of the bolt, with the result that the race 1 is forced from the support. After the race has been forced from the support the body 5 is screwed toward the end of the bolt, permitting compression of the ring 6 and removal of the race therefrom.

In the modified form of key shown in Figs. 4 and 5 a pair of arcuate key members 9 are utilized for cooperation with the body 5 in practically the same manner that the ring 6 cooperates with the body 5. The key member 9 is formed with a peripheral flange 10 engageable in the groove of the race 1 effectively to force the race from the support when the bolt is turned.

The modified form shown in Figs. 6 and 7 comprises a key member having a portion 11 arranged to remain within the race or bushing to limit spreading of the key when the bolt is turned to force the ring or bushing from the support; and a circumferential shoulder 12 arranged to abut against the side edge of the race or bushing and force the same from the support when the bolt 3 is turned. This form of the device is specially designed and adapted for use in removing bushings and the like in which there is no internal groove within which the ring 6 or flanges 10 could engage.

From the foregoing it will be seen that my invention is an efficient tool which may be economically manufactured and which is easy to manipulate. The device may be modified otherwise than as specifically described, and I do not restrict myself in these particulars, but what I claim and desire to secure by Letters Patent is:—

1. A device of the character described comprising a tapered body, a bolt arranged to screw through and project beyond the end of said body, and an expansible ring having sliding connection with said body and arranged to be expanded by said body when slid toward the larger end of the body.

2. A device of the character described comprising a tapered body, a bolt arranged to screw through and project beyond the end of said body, an expansible and compressible ring embracing said body, and means for holding said ring in connection with said bolt.

3. A device of the character described comprising a tapered body, a bolt having an engageable portion at one end and threads at the opposite end screwed through and projecting beyond the outer end of said body, and a key embracing said body and arranged to be expanded by said body.

4. A device of the character described comprising a tapered body, a key embracing said body and arranged to be expanded thereby, and means for engaging a support and moving said body and said key to engage said key with an element to be removed from said support, and to force said element from said support.

5. A device of the character described comprising a key, means for expanding said key into engagement with a race ring or bushing in a support, and an element for actuating said means to expand said key and force the same to force the race ring or bushing from said support.

CLAUDE M. McCORD.